United States Patent
Sica et al.

(10) Patent No.: US 10,325,694 B2
(45) Date of Patent: Jun. 18, 2019

(54) ENERGY CABLE HAVING A CROSSLINKED ELECTRICALLY INSULATING LAYER, AND METHOD FOR EXTRACTING CROSSLINKING BY-PRODUCTS THEREFROM

(71) Applicant: PRYSMIAN S.P.A., Milan (IT)

(72) Inventors: Rodolfo Sica, Milan (IT); Pietro Richard Anelli, Milan (IT)

(73) Assignee: PRYSMIAN S.P.A, Milan (IT)

( * ) Notice: Subject to any disclaimer, the term of this patent is extended or adjusted under 35 U.S.C. 154(b) by 0 days.

(21) Appl. No.: 15/030,292

(22) PCT Filed: Oct. 23, 2013

(86) PCT No.: PCT/IB2013/059562
§ 371 (c)(1),
(2) Date: Apr. 18, 2016

(87) PCT Pub. No.: WO2015/059520
PCT Pub. Date: Apr. 30, 2015

(65) Prior Publication Data
US 2016/0268018 A1    Sep. 15, 2016

(51) Int. Cl.
*H01B 9/00*    (2006.01)
*H01B 7/00*    (2006.01)
(Continued)

(52) U.S. Cl.
CPC .......... *H01B 7/0009* (2013.01); *C01B 39/46* (2013.01); *H01B 3/006* (2013.01); *H01B 13/002* (2013.01); *H01B 13/22* (2013.01)

(58) Field of Classification Search
CPC ... H01B 1/14; H01B 1/18; H01B 1/20; H01B 3/02; H01B 3/04; H01B 3/28;
(Continued)

(56) References Cited

U.S. PATENT DOCUMENTS 4,717,236 A    1/1988 Dewing
4,791,240 A *  12/1988 Marin ................ H01B 3/441
                                              174/23 C
(Continued)

FOREIGN PATENT DOCUMENTS

CN    1127921    7/1996
CN    101679870    3/2010
(Continued)

OTHER PUBLICATIONS

Notication of the First Office Action from the State Intellectual Property Office of the People's Republic of China, in counterpart Chinese Application No. 201380080247.2 (dated Nov. 30, 2016).
(Continued)

*Primary Examiner* — William H. Mayo, III
(74) *Attorney, Agent, or Firm* — Finnegan, Henderson, Farabow, Garrett & Dunner, L.L.P.

(57) ABSTRACT

An energy cable includes, at least one cable core including an electric conductor, a crosslinked electrically insulating layer, and zeolite particles placed in the cable core. The zeolite particles are able to extract and absorb, very efficiently and irreversibly, the by-products deriving from the cross-linking reaction, so as to avoid space charge accumulation in the insulating material during cable lifespan. A method for extracting crosslinking by-products from a crosslinked electrically insulating layer of an energy cable core, which includes manufacturing the energy cable core containing zeolite particles, heating the energy cable core up to a temperature causing migration of the crosslinking by-products from the crosslinked electrically insulating layer; and then placing a metal screen around the energy cable core.

11 Claims, 3 Drawing Sheets

(51) Int. Cl.
  *H01B 3/00* (2006.01)
  *C01B 39/46* (2006.01)
  *H01B 13/00* (2006.01)
  *H01B 13/22* (2006.01)
(58) Field of Classification Search
  CPC ..... H01B 3/30–3/56; H01B 7/02; H01B 7/28;
      H01B 7/29; H01B 9/006; H01B 9/02;
      H01B 13/14–13/16
  USPC ............. 174/110 R, 111, 118, 120 R, 121 R,
      174/121 A, 121 AR–121 SR, 120 SC,
      174/110 A–110 E
  See application file for complete search history.

(56) References Cited

U.S. PATENT DOCUMENTS

| | | | | |
|---|---|---|---|---|
| 5,190,815 | A * | 3/1993 | Kobayashi | G02B 6/4492 138/DIG. 7 |
| 5,204,402 | A * | 4/1993 | Foster | C08K 3/34 106/482 |
| 5,492,760 | A * | 2/1996 | Sarma | C08L 43/04 428/378 |
| 6,005,192 | A * | 12/1999 | Mashikian | H01B 7/2813 174/110 AR |
| 6,205,276 | B1 | 3/2001 | Anelli et al. | |
| 6,383,634 | B1 * | 5/2002 | Kornfeldt | H01B 3/20 174/110 PM |
| 8,206,825 | B2 * | 6/2012 | Appel | C08L 23/06 174/110 PM |
| 8,398,803 | B2 | 3/2013 | Olsson | |
| 2003/0164483 | A1 | 9/2003 | Scelza et al. | |
| 2007/0262483 | A1 | 11/2007 | Grasselli et al. | |
| 2009/0022462 | A1 | 1/2009 | Papazoglou et al. | |
| 2009/0101387 | A1 * | 4/2009 | Parsons | B29C 47/003 174/113 R |
| 2010/0044068 | A1 * | 2/2010 | Deighton | H01B 7/0072 174/107 |
| 2010/0108357 | A1 * | 5/2010 | Smedberg | C08F 210/02 174/120 SC |
| 2010/0140877 | A1 | 6/2010 | Pratley | |
| 2010/0212930 | A1 * | 8/2010 | Yasumoto | C09K 21/02 174/110 SR |
| 2010/0314022 | A1 | 12/2010 | Olsson | |
| 2012/0181058 | A1 * | 7/2012 | Chaudhary | C08K 5/0091 174/110 V |
| 2012/0181061 | A1 * | 7/2012 | Chaudhary | C08K 5/10 174/120 C |
| 2014/0220343 | A1 * | 8/2014 | Choi | H01B 3/18 428/389 |
| 2016/9268018 | | 9/2016 | Sica et al. | |
| 2016/9325228 | | 11/2016 | Feyen et al. | |
| 2018/0019582 | A1 | 1/2018 | Boffi et al. | |

FOREIGN PATENT DOCUMENTS

| | | | | |
|---|---|---|---|---|
| CN | 101911213 | A | 12/2010 | |
| CN | 102417683 | A | 4/2012 | |
| CN | 102492199 | A * | 6/2012 | ............ H01B 7/34 |
| CN | 102492199 | A | 6/2012 | |
| CN | 102516694 | A | 6/2012 | |
| GB | 2464610 | | 4/2010 | |
| GB | 2513991 | A | 11/2014 | |
| JP | 64-24308 | | 2/1989 | |
| JP | 02-253513 | | 10/1990 | |
| JP | 05-047238 | * | 2/1993 | ............ H01B 7/34 |
| JP | 05-47238 | A * | 2/1993 | ............ C08K 3/34 |
| WO | WO 95/09426 | | 4/1995 | |
| WO | WO 97/04466 | | 2/1997 | |
| WO | WO 98/52197 | | 11/1998 | |
| WO | WO 2015/059520 | A1 | 4/2015 | |
| WO | WO 2016/116779 | A1 | 7/2016 | |

OTHER PUBLICATIONS

International Search Report from the European Patent Office for International Application No. PCT/IB2013/059562, dated June. 17, 2014.
Written Opinion of the International Searching Authority from the European Patent Office for International Application No. PCT/IB2013/059562, dated Jun. 17, 2014.
International Search Report dated Sep. 29, 2015, in PCT international Application No. PCT/IB2015/050469 (4 pages).
International Preliminary Report on Patentability dated Jul. 25, 2017, in PCT International Application No. PCT/IB2015/050469 (6 pages).
Database WPI Week 201235 Entry dated Apr. 18, 2012 (XP-002744398) (1 page). [abstract for CN 102417683].
Fang, Z. et al., "Crosslinking and Compatibilization in Blends of Polystyrene and Polyethylene", Chinese Journal of Polymer Science, 16 (3): pp. 207-213 (1998).
Notification of the Third Office Action in counterpart Chinese Patent Application No. 201380080247.2, dated Jan. 22, 2019 (26 pages, including translation)
American Heritage College Dictionary, 448 & 770 (3rd Ed. 1993).
Notification of the First Office Action in Chinese Patent Application No. 201580078984.8, dated Oct. 8, 2018, and Chinese Search Report in Chinese Patent Application No. 201580078984.8 (21 pages including translation).
Office Action in Russian Patent Application No. 2017135100/07(061406), dated Oct. 26, 2018 (8 pages including translation).
Search Report in Russian Patent Application No. 2017135100/07(061406), dated Oct. 25, 2018 (4 pages including translation).
McCusker. L. B. et al., "Nomenclature of Structural and Compositional Characteristics of Ordered Microporous and Mesoporous Materials with Inorganic Hosts", International Union of Pure and Applied Chemistry, vol. 73, No. 2, pp. 381-394, 2001.
International Search Report from the European Patent Office for International Application No. PCT/IB2015/052945, dated Jan. 8, 2016.
Written Opinion of the International Searching Authority from the European Patent Office for International Application No. PCT/IB2015/052945, dated Jan. 8, 2016.
Non-Final Office Action for U.S. Appl. No. 15/567,829, dated May 11, 2018.

* cited by examiner

ENERGY CABLE HAVING A CROSSLINKED ELECTRICALLY INSULATING LAYER, AND METHOD FOR EXTRACTING CROSSLINKING BY-PRODUCTS THEREFROM

CROSS REFERENCE TO RELATED APPLICATION

This application is a national phase application based on PCT/IB2013/059562, filed Oct. 23, 2013, the content of which is incorporated herein by reference.

BACKGROUND OF THE INVENTION

The present invention relates to an energy cable having a crosslinked electrically insulating layer, and to a method for extracting crosslinking by-products therefrom.

Cables for transporting electric energy generally include at least one cable core. The cable core is usually formed by at least one conductor sequentially covered by an inner polymeric layer having semiconducting properties, an intermediate polymeric layer having electrically insulating properties, an outer polymeric layer having semiconducting properties. Cables for transporting medium or high voltage electric energy generally include at least one cable core surrounded by at least one screen layer, typically made of metal or of metal and polymeric material. The screen layer can be made in form of wires (braids), of a tape helically wound around the cable core or a sheet longitudinally wrapped around the cable core.

The polymeric layers surrounding the conductor are commonly made from a polyolefin-based crosslinked polymer, in particular crosslinked polyethylene (XLPE), or elastomeric ethylene/propylene (EPR) or ethylene/propylene/diene (EPDM) copolymers, also crosslinked, as disclosed, e.g., in WO 98/52197. The crosslinking step, carried out after extruding the polymeric material onto the conductor, gives the material satisfactory mechanical and electrical properties even under high temperatures both during conventional use and with current overload.

The crosslinking process of polyolefin materials, particularly polyethylene (XLPE), requires addition to the polymeric material of a crosslinking agent, usually an organic peroxide, and subsequent heating at a temperature to cause peroxide cleavage and reaction. By-products are formed mainly deriving from the decomposition of the organic peroxide. In the presence of a continuous electrical field, such by-products, being entrapped within the crosslinked material, cause an accumulation of space charges which may cause electrical discharges and eventually insulation piercing, particularly in direct current (DC) energy cables. For instance, dicumyl peroxide, the most common crosslinking agent used for cable insulation, forms methane (light by-product) and heavy by-products, mainly acetophenone and cumyl alcohol. Methane can be eliminated from the cable core with a short degassing process at a relatively low temperature (about 70° C.), while acetophenone and cumyl alcohol can be removed only by subjecting the cable core to a prolonged degassing process, at a temperature suitable to cause migration of the by-products (usually about 70° C.÷80° C.) and subsequent evaporation from the cable core. This degassing process must be performed for a long time (usually from 15 days to about 2 months, depending on the cable dimensions) and cannot be carried out continuously but only batchwise in large degassing devices which can host a given cable length. This increases to a large extent the time and production costs of DC energy cables.

In US 2010/0314022 a process is described for producing an insulated DC cable with an extruded polymer based electrical insulation system, which comprises the steps of: providing a polymer based insulation system comprising a compounded polymer composition, preferably a compounded polyethylene composition; optionally cross-linking the polymer composition; and finally exposing the polymer based insulation system to a heat treatment procedure while the outer surface of the polymer based insulation system is covered by a cover impermeable to at least one substance present in the polymer based insulation system in a non-homogenous distribution, thereby equalizing the concentration of the at least one substance in the polymer based insulation system. The at least one substance comprises typically cross linking by-products and various additives, which typically increase the material conductivity. Preferably a thin metallic foil or similar is wrapped around the roll of DC cable. Alternatively, the impermeable cover can be the metallic screen or the outer covering or sheath arranged outside the metallic screen. The overall effect of such a process is that of equalizing as much as possible the concentration of the crosslinking by-products within the insulating layer, which, however, are not removed from the cable core.

JP 64-024308 relates to a DC power cable provided with a space charge buffer layer placed between the inner semiconducting layer and the insulating layer or between the outer semiconducting layer and the insulating layer, the space charge buffer layer being formed by a copolymer of ethylene with an aromatic monomer, e.g. styrene, in an amount from 0.01 to 2 mol % per 1 mol of ethylene. Due to the resonance effect of the benzene ring of the aromatic monomer, the surrounding electron energy is absorbed and the formation of space charge is prevented, and in addition it is possible to improve the dielectric strength of the base polymer.

JP 02-253513 relates to a cross-linked polyethylene insulation cable that should prevent oxidative degradation caused by contact with oxygen and should enable continuous operation at high temperatures. As by-product of the organic peroxide, cumyl alcohol undergoes degradation to form α-methylstyrene and water. The degradation of cumyl alcohol is accelerated in the presence of oxygen. The moisture that is formed by the above degradation may cause appearance of voids and bow-tie trees with consequent degradation of the insulating material. To prevent such drawbacks, a plastic material containing an oxygen absorbent is arranged on the central part and the outer semiconducting layer of the conductor.

As oxygen absorbent, a deoxidizer may be used, such as a commercially available product known as Ageless by Mitsubishi Gas Chemical Co., which is formed by iron oxide/potassium chloride.

SUMMARY OF THE INVENTION

The Applicant has faced the problem of eliminating the high temperature, long lasting degassing process of the energy cable cores having a crosslinked insulating layer, or at least to reduce temperature and/or duration of the same, so as to increase productivity and reduce manufacturing costs. The above goal should be achieved without increasing the complexity of the cable production and, of course, without any detrimental effects on cable performance even after many years from installation.

The above problem and others that will appear more clearly from the following description can be solved by providing the cable core with zeolite particles placed in the vicinity of the crosslinked insulating layer, more specifically in the cable core, for instance within the cable conductor and/or on the outer semiconducting layer. The zeolite particles are able to extract and absorb, very efficiently and irreversibly, the by-products deriving from the cross-linking reaction, so as to avoid space charge accumulation in the insulating material during cable lifespan.

Therefore, according to a first aspect, the present invention relates to an energy cable comprising at least one cable core comprising an electric conductor, a crosslinked electrically insulating layer, and zeolite particles placed in the cable core.

According to a second aspect, the present invention relates to a method for extracting crosslinking by-products from a cross-linked electrically insulating layer of an energy cable core, said method comprising the following sequential stages:

manufacturing an energy cable core comprising an electric conductor, a crosslinked electrically insulating layer containing cross-linking by-products, and zeolite particles;

heating the energy cable core up to a temperature causing migration of the crosslinking by-products from the crosslinked electrically insulating layer; and then placing a metal screen around the energy cable core.

The heating step of the method of the invention causes at least one fraction of the crosslinking by-products to be substantially irreversibly absorbed into the zeolite particles, while another fraction diffuses outside the cable core.

In particular, the zeolite particles substantially irreversibly absorb some of the crosslinking by-products during the heating step. During the heating step, a fraction of crosslinking by-products which is gaseous at ambient temperature, such as methane, or which has a low boiling point, is eliminated by causing it to diffuse out of the cable core. Preferably, the heating step is carried out at a temperature of from 70° C. to 80° C., for a time from 7 to 15 days. The presence of zeolite particles in the vicinity of the crosslinked electrically insulating layer avoids to extend the degassing procedure for a longer time (usually from 15 to 30 days), for removing high-boiling by-products, such as cumyl alcohol and acetophenone.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

For the purposes of the invention the term "medium voltage" generally means a voltage of between 1 kV and 35 kV, whereas "high voltage" means voltages higher than 35 kV.

As "electrically insulating layer" it is meant a covering layer made of a material having insulating properties, namely having a dielectric rigidity (dielectric breakdown strength) of at least 5 kV/mm, preferably of at least 10 kV/mm.

As "crosslinked electrically insulating layer" it is meant an insulating layer made of a crosslinked polymer.

For the purpose of the present description and of the claims that follow, as "irreversible absorption" and the like it is meant that once absorbed by the zeolite particles no substantial release of by-products is observed after the cable is enclosed within a hermetic sheath, such as, for example, the metallic screen.

As "core" or "cable core" it is meant the cable portion comprising an electrical conductor, an insulating layer surrounding said conductor and, optionally, at least one semiconducting layer, for example an inner semiconducting layer surrounding the conductor in a radially internal position with respect to the insulating layer and/or an outer semiconducting layer surrounding the insulating layer.

For the purpose of the present description and of the claims that follow, the term "in the cable core" means any position inside or in direct contact with at least one of the cable core components.

According to a first embodiment, the electric conductor is formed by a plurality of stranded electrically conducting filaments and the zeolite particles are placed within voids among said filaments.

The cable of the invention can have one, two or three cable cores.

Preferably the cable of the invention comprises a cable core comprising at least one semiconducting layer.

According to a second embodiment, the zeolite particles are placed in contact with the semiconducting layer. Preferably, such semiconducting layer is an outer semiconducting layer disposed over the crosslinked electrically insulating layer.

According to a third embodiment, the zeolite particles are placed into the semiconducting layer. Preferably, such semiconducting layer is an inner semiconducting layer disposed over the electric conductor.

According to a fourth embodiment, the zeolite particles are placed both within voids among the filaments of the electric conductor, and into or in contact with a semiconducting layer, preferably the outer semiconducting layer. In that way, the effect of the zeolite particles is exerted on both sides of the electrically insulating layer, and therefore the extraction and absorption of the crosslinking by-products is more efficient.

The zeolite particles of the invention can be dispersed in or on a material placed into the cable core.

According to a preferred embodiment, the zeolite particles are dispersed in a filling material. The filling material is preferably a polymeric filling material which can be provided in the cable core by a continuous deposition process, especially by extrusion or by pultrusion. The filling material is preferably a buffering filling material which is usually placed among the filaments forming the electric conductor of an energy cable in order to avoid propagation of water or humidity that can penetrate within the cable conductor, especially when the cable is to be installed in very humid environments or under water. The buffering filling material generally comprises a polymeric material and a hygroscopic material, for example a compound based in an ethylene copolymer, for example an ethylene/vinyl acetate copolymer, filled with a water absorbing powder, for example sodium polyacrylate powder.

According to another embodiment, the zeolite particles are dispersed on the surface of a hygroscopic yarn or hygroscopic tape. Hygroscopic yarns are generally known in energy cables to be placed in contact with the conductor filaments and/or with the outer semiconducting layer so as to provide water-blocking properties. The hygroscopic yarns are generally made from polymer filaments, e.g. polyester filaments, on which particles of a hygroscopic material, for instance polyacrylate salts, are deposited by means of an adhesive material, typically polyvinyl alcohol (PVA). Such yarns can be modified according to the present invention by depositing on the polymer filaments a mixture of hygroscopic particles and zeolite particles. In particular, the polymer filaments can be moistened with a solution of an adhesive material, and then the zeolite particles are sprinkled thereon and remain entrapped in the solution and, after drying, in the adhesive material.

A similar technique can be used to provide hygroscopic tapes including zeolite particles. The hygroscopic tapes commonly used in energy cables can be non-conductive, in case they are placed onto the cable screen, or they can be semiconducting when placed in contact with the outer semiconducting layer. On the tapes, usually made from a non-woven fabric of polymer filaments, particles of a hygroscopic material, for instance polyacrylate salts, are deposited by means of an adhesive material, as mentioned above. Such tapes can be modified according to the present invention by depositing a mixture of hygroscopic particles and zeolite particles on the non-woven fabric.

According to the above preferred embodiments, it is apparent that the zeolite particles can be placed in the vicinity of the crosslinked electrically insulating layer by means of cable elements that are already usual components of energy cables, such as hygroscopic yarns or tapes or buffering filling materials, thus avoiding supplementing the cable with an additional component which would not be necessary for a conventional cable. This remarkably reduces cable manufacturing costs and time. The above advantage does not exclude the possibility of providing the energy cable with zeolite particles by means of one or more additional components purposively placed into the cable to obtain extraction and absorption of the crosslinking by-products.

As regards the zeolite particles suitable for the present invention, they can be selected from a wide range of aluminosilicates of natural or synthetic origin, having a microporous structure that can accommodate a variety of cations, such as $Na^+$, $K^+$, $Ca^{2+}$, $Mg^{2+}$ and others. They act as molecular sieves due to their ability to selectively sort molecules mainly on the basis of a size exclusion process. They are also widely used as catalysts, especially in the petrochemical industry.

Although not being bound to any theory to explain the present invention, the Applicant believes that zeolite particles are particularly effective as irreversible absorbers for the crosslinking by-products, such as acetophenone and cumyl alcohol, since these molecules, when entered within the zeolite microporous structure, seem to undertake oligomerization reactions (specifically, dimerization reaction) converting them into much more bulky molecules. As a result, the now bulky crosslinking by-products become irreversibly trapped within the zeolite structure and cannot migrate back outside, even after prolonged exposure to relatively high temperatures, such as those reached by the energy cable during use. Even in the absence of oligomerization reactions, the by-products mainly remain into the zeolite particles because their solubility into the crosslinked polymer is lower than that into the zeolite particles.

Preferably, the zeolite particles have a $SiO_2/Al_2O_3$ molar ratio equal to or lower than 20, more preferably equal to or lower than 15.

Preferably, the zeolite particles have a maximum diameter of a sphere than can diffuse along at least one (preferably all the three) of the cell axes directions (hereinafter also referred to as "sphere diameter") equal to or greater than 3 Å. As well known in the zeolite field, this sphere diameter provides quantitative information about the size of the channels present in the zeolite structure, which can develop in one dimension, two dimensions or three dimensions (the so called "dimensionality" which can be 1, 2 or 3). Preferably, the zeolite particles of the invention has a dimensionality of 2, more preferably of 3.

Preferably, the zeolite particles have a sodium content, expressed as $Na_2O$, equal to or lower than 0.3% by weight.

The zeolite particles having $SiO_2/Al_2O_3$ molar ratio, sphere diameter and sodium content in the preferred ranges according to the invention are capable to absorb an amount of high boiling cross-linking by-products in a given time higher than other zeolite particles having at least one of the mentioned feature out of the range according to the invention.

More details about zeolite nomenclature and parameters can be found, e.g., in IUPAC Recommendations 2001, *Pure Appl. Chem.*, Vol. 73, No. 2, pp. 381-394, 2001, or in the website of the International Zeolite Association (IZA) (http://www.iza-structure.org/).

As regards the amount of zeolite particles to be placed in the vicinity of the crosslinked electrically insulating layer, it can vary within a wide range and mainly depends on the type of zeolite, the amount of by-products to be eliminated, the thickness of the insulating layer, the degassing temperature, and the final target by-products content. According to preliminary evaluations, assuming a final target of 0.32 wt % of cumyl alcohol content, the zeolite particles are preferably present in an amount of from 70 g/m to 1000 g/m for a 25 mm insulating thickness and from 27 g/m to 450 g/m for a 15 mm insulating thickness, more preferably from 70 g/m to 210 g/m for a 25 mm insulating thickness and from 27 g/m to 80 g/m for a 15 mm insulating thickness, the units being expressed as amount of zeolite particles (in grams) versus the length of the cable (in meters). In view of the above ranges and indications, the skilled person is able determine a suitable amount of zeolite particles to be added to a given insulation layer without undue burden.

As regards the crosslinked electrically insulating layer, it preferably comprises at least one polyolefin, more preferably at least one ethylene homopolymer or copolymer of ethylene with at least one alpha-olefin $C_3$-$C_{12}$, having a density from 0.910 $g/cm^3$ to 0.970 $g/cm^3$, more preferably from 0.915 $g/cm^3$ to 0.940 $g/cm^3$.

Preferably, the ethylene homopolymer or copolymer has a melting temperature ($T_m$) higher than 100° C. and/or a melting enthalpy ($\Delta H_m$) higher than 50 J/g.

Preferably, the ethylene homopolymer or copolymer is selected from: medium density polyethylene (MDPE) having a density from 0.926 $g/cm^3$ to 0.970 $g/cm^3$; low density polyethylene (LDPE) and linear low density polyethylene (LLDPE) having a density from 0.910 $g/cm^3$ to 0.926 $g/cm^3$; high density polyethylene (HDPE) having a density from 0.940 $g/cm^3$ to 0.970 $g/cm^3$. In an embodiment of the invention the crosslinked electrically insulating layer comprises LDPE.

Preferably, the polyolefin forming the crosslinked electrically insulating layer is crosslinked by reaction with at least one organic peroxide. Preferably, the organic peroxide has formula $R_1$—O—O—$R_2$, wherein $R_1$ and $R_2$, equal or different from each other, are linear or, preferably, branched alkyls $C_1$-$C_{18}$, aryls $C_6$-$C_{12}$, alkylaryls or arylalkyls $C_7$-$C_{24}$. In a preferred embodiment, the organic peroxide is selected from: dicumyl peroxide, t-butyl cumyl peroxide, 2,5-dimethyl-2,5-di(t-butyl peroxy)hexane, di-t-butyl peroxide, or mixtures thereof.

Preferably, the organic peroxide is added to the polyolefin in an amount of from 0.05% to 8% by weight, more preferably from 0.1% to 5% by weight.

The crosslinked electrically insulating layer may further comprise an effective amount of one or more additives, selected e.g. from: antioxidants, heat stabilizers, processing aids, antiscorching agents, inorganic fillers.

The cable according to the present invention further includes at least one semiconducting layer. The semiconducting layer is preferably formed by a crosslinked polymeric material, more preferably the same crosslinked polyolefin used for the electrically insulating layer, and at least one conductive filler, preferably a carbon black filler. The conductive filler is generally dispersed within the crosslinked polymeric material in a quantity such as to provide the material with semiconducting properties, namely to obtain a volumetric resistivity value, at room temperature, of less than 500 $\Omega \cdot m$, preferably less than 20 $\Omega \cdot m$. Typically, the amount of carbon black can range between 1 and 50% by weight, preferably between 3 and 30% by weight, relative to the weight of the polymer.

The production of the energy cable according to the present invention can be carried out according to known techniques, particularly by extrusion of the electrically insulating layer and of the at least one semiconducting layer over the electric conductor.

According to a preferred embodiment, the electric conductor is formed by a plurality of stranded electrically conducting filaments and the zeolite particles are placed within voids among said filaments.

Alternatively, the zeolite particles may be preferably deposited on at least one hygroscopic yarn placed in contact with the stranded electrically conducting filaments.

According to another embodiment, the zeolite particles may be dispersed in a filling material and the filling material containing the zeolite particles is extruded or pultruded on the electric conductor so as to fill voids among the conductor filaments.

According to another preferred embodiment, the hygroscopic tape containing the zeolite particles is wound onto an outer semiconducting layer disposed over the electrically insulating layer. Subsequently, the cable core, devoid of the metal screen, is heated to a temperature so as to cause migration of the crosslinking by-products from the crosslinked electrically insulating layer to the zeolite particles, thereby the zeolite particles absorb the crosslinking by-products. Afterwards, a metal screen is placed around the energy cable core according to well known techniques.

BRIEF DESCRIPTION OF THE DRAWING

Further characteristics will be apparent from the detailed description given hereinafter with reference to the accompanying drawings, in which.

DETAILED DESCRIPTION OF THE PREFERRED EMBODIMENTS

Figure 1:
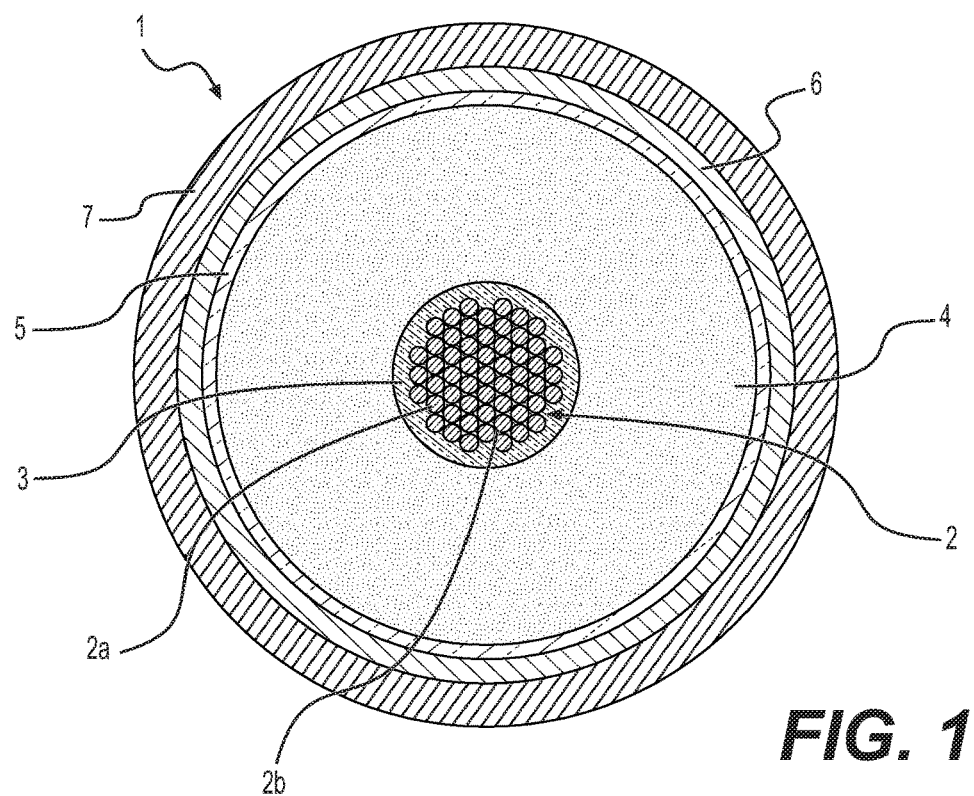
FIG. 1 is a transversal cross section of a first embodiment of an energy cable, particularly suitable for medium or high voltage, according to the present invention.

In FIG. 1, a transversal section of a first preferred embodiment of a cable (1) according to the present invention is schematically represented, which comprises an electric conductor (2), an inner semiconducting layer (3), an electrically insulating layer (4), an outer semiconducting layer (5), a metal screen (6) and a sheath (7). Electric conductor (2), inner semiconducting layer (3), electrically insulating layer (4) and outer semiconducting layer (5) constitute the core of cable (1). Cable (1) is particularly intended for the transport of medium or high voltage current.

The conductor (2) consists of metal filaments (2a), preferably of copper or aluminium or both, stranded together by conventional methods. The electrically insulating layer (4), the semiconducting layers (3) and (5) are made by extruding polymeric materials according to known techniques. Around the outer semiconducting layer (5), a metal screen layer (6) is usually positioned, made of electrically conducting wires or strips helically wound around the cable core or of an electrically conducting tape longitudinally wrapped and overlapped (preferably glued) onto the underlying layer. The electrically conducting material of said wires, strips or tape is usually copper or aluminium or both. The screen layer (6) may be covered by a sheath (7), generally made from a polyolefin, usually polyethylene, in particular high density polyethylene. In accordance with an embodiment of the present invention, the zeolite particles dispersed in a filling material are placed within voids (2b) among said filaments (2a).

Figure 2:
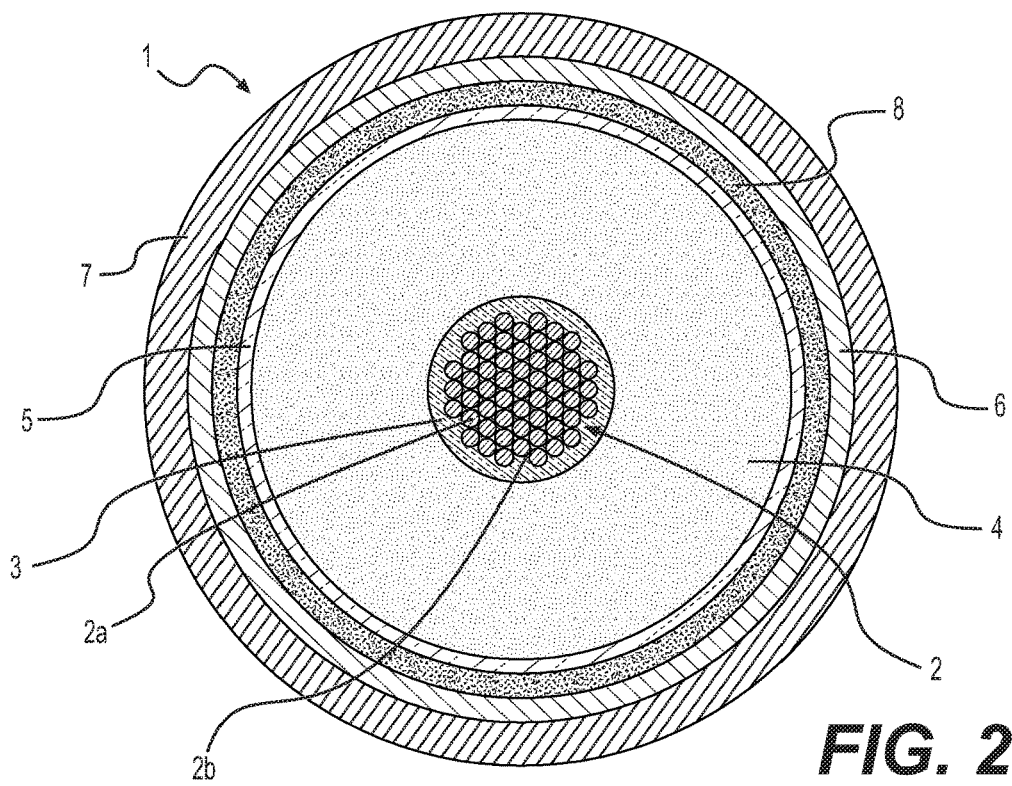
FIG. 2 is a transversal cross section of a second embodiment of an energy cable, particularly suitable for medium or high voltage, according to the present invention.

In FIG. 2, a transversal section of another embodiment of the cable (1) according to the present invention is schematically represented, which comprises the same elements as described in FIG. 1, with the addition of a hygroscopic tape (8), wound onto the outer semiconducting layer (5), wherein the zeolite particles are dispersed. In a further embodiment, the zeolite particles may be also dispersed in a filling material placed within voids (2b) among the metal filaments (2a) forming the electric conductor (2), analogously to what described in FIG. 1.

In another further embodiment, the semiconducting layer (3) of the cable (1) is in the form of a semiconductive tape wound around the electric conductor (2), such semiconductive tape containing zeolite particles.

FIGS. 1 and 2 show only two embodiments of the present invention. Suitable modifications can be made to these embodiments according to specific technical needs and application requirements without departing from the scope of the invention.

The following examples are provided to further illustrate the invention.

EXAMPLES 1-7

Some tests were carried out to evaluate the ability of different materials to absorb cumyl alcohol, one of the major by-products deriving from crosslinking reaction of polyethylene with cumyl peroxide. Each material in the form of fine particles was placed in an amount of about 0.6 g in little bags made from a non-woven polyester fabric, which are porous so as to allow free migration of cumyl alcohol molecules.

The little bags of the materials to be tested were placed in a cylinder made from aluminum, having a plurality of recesses to host the samples and a central circular cavity where a glass beaker containing cumyl alcohol was placed. In one of the recesses a fully degassed sample of crosslinked polyethylene (XLPE) was placed to measure the solubility of cumyl alcohol in that material as reference. The cylinder, containing the little bags of the materials to be tested, the sample of XLPE and the cumyl alcohol, was fastened with a closing plate provided with an O-ring to obtain an airtight closure. The amount of cumyl alcohol absorbed by each sample was measured by weighing the sample at regular intervals up to 1460 hours of exposure to cumyl alcohol when asymptotic conditions have been reached at all temperatures in the 40° to 70° C. range. The solubility of cumyl alcohol in each sample was calculated as:

$$C.A. \text{ solubility} = \frac{C.A. \%}{p(C.A.)}$$

wherein:
C.A. % is the weight percentage of cumyl alcohol absorbed by the sample with respect to the initial weight of the sample;
p(C.A.) is the vapour tension of cumyl alcohol at the testing temperature (expressed in bar).

The test was carried out at different temperatures (40° C., 60° C. and 70° C.). The results are reported in Table 1.

TABLE 1

| | | C.A. Solubility (% w/bar) | | |
|---|---|---|---|---|
| Example | Material | 40° C. | 60° C. | 70° C. |
| 1 (*) | XLPE | 15,804 | 7,648 | 5,421 |
| 2 (*) | Dellite 72T | 106,438 | 24,068 | 19,322 |
| 3 (*) | Carbon D | 212,452 | 52,204 | 35,184 |
| 4 (*) | Supelcarb | 241,933 | 61,572 | 41,330 |
| 5 (*) | J550 | 278,031 | 20,396 | 26,292 |
| 6 | CBV 600 | 1,154,989 | 257,433 | 131,559 |
| 7 | CBV 712 | 1,151,132 | 255,940 | 128,989 |

The examples marked with an asterisk (*) are comparative.
XLPE: polyethylene (*Borealis* LE 4253) crosslinked by cumyl peroxide (1.45 wt %, preheating at 120° C. for 2 minutes, heating at 150° C. for 15 minutes and final cooling at 20° C.);
Dellite 72T: montmorillonite nanoclay modified with quaternary ammonium salt (Laviosa Chimica Mineraria S.p.A.);
Carbon D: active carbon Carbon Decolorans code 434507 (Carlo Erba, IT)
Supercarb: active carbon Adsorbent 2-4566 (SUPELCO, Bellefonte Pa. USA)
J550: sodium polyacrylate resin Aqua keep 10SH-P (SUMITOMO SEIKA)
CBV 600: Y-type zeolite having: specific surface area=660 m$^2$/g; SiO$_2$/Al$_2$O$_3$ ratio=5.2; Na$_2$O %=0.2; dimensionality=3; maximum diffusing sphere diameter=7.35 Å (ZEOLYST);
CBV 712: Y-type zeolite having: specific surface area=730 m$^2$/g; SiO$_2$/Al$_2$O$_3$ ratio=12; Na$_2$O %=0.05; dimensionality=3; maximum diffusing sphere diameter=7.35 Å (ZEOLYST).

From the data reported in Table 1, it is apparent that in the Example 6 and 7 according to the invention the zeolites are able to absorb cumyl alcohol in large amounts, much greater than those obtainable by means of other absorbing materials, such as montmorillonite nanoclay, carbon particles and sodium polyacrylate resin, a water absorbing material commonly used in energy cables.

EXAMPLES 8-11

In order to simulate the conditions in an energy cable, the absorption ability of zeolite CBV 600 was evaluated according to the following method.

The crosslinkable *Borealis* LE 4253, commonly used as insulating material for DC energy cables, was used to produce discs of freshly crosslinked polyethylene as disclosed above.

Figure 3:
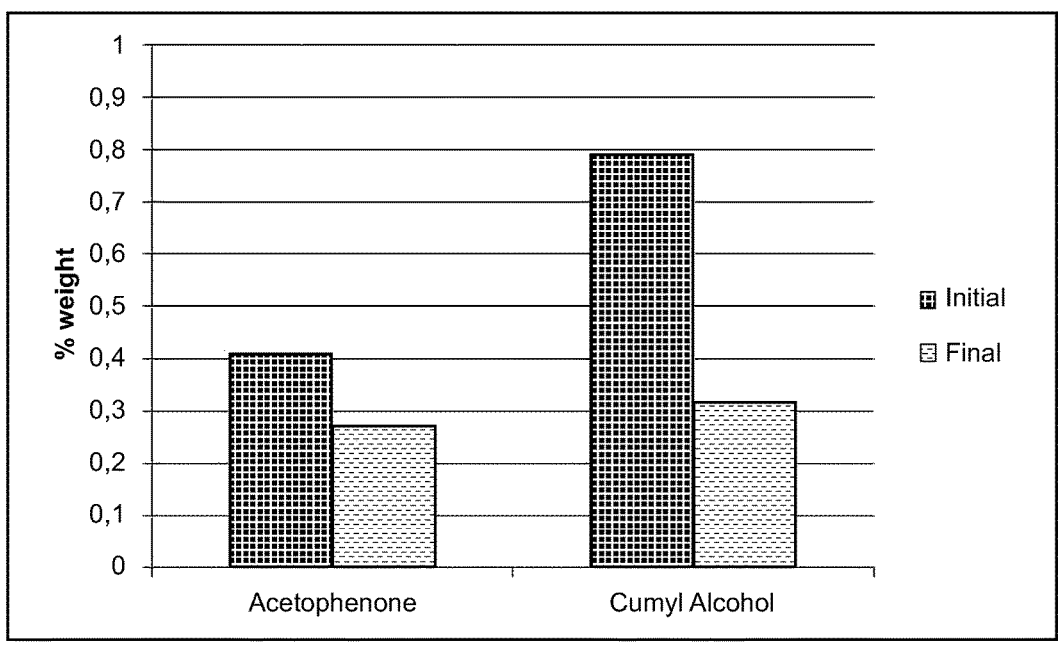
FIGS. 3, 4 and 5 show some experimental results obtained according to the examples reported hereinbelow.
Figure 4:
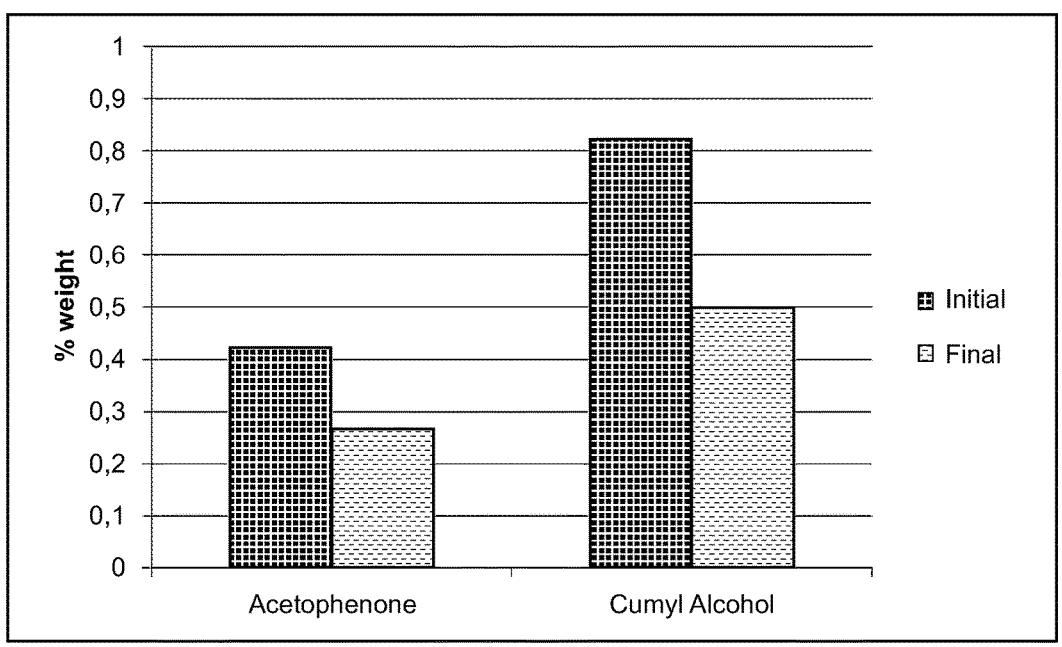

A disc of freshly crosslinked LE 4253 (diameter 140 mm, thickness 2.87 mm) was placed in a cylinder similar to that of Examples 1-7, but devoid of recesses and cavity to host samples and container, and three little bags as described in Examples 1-7 containing zeolite CBV 600 were placed on the disc (weight ratio zeolite/LE 4253=0.013). The testing device was closed airtight and maintained at the testing temperature (60° C. or 40° C.) for 16 days. In the diagrams of FIGS. 3-4, the amounts of acetophenone and cumyl alcohol in the LE 4253 disc as such (i.e. just after crosslinking) and after contact with the zeolite are reported. A remarkable reduction of the amount of crosslinking by-products in the insulating material when placed in contact with the zeolite particles is apparent.

EXAMPLES 12-13

Figure 5:
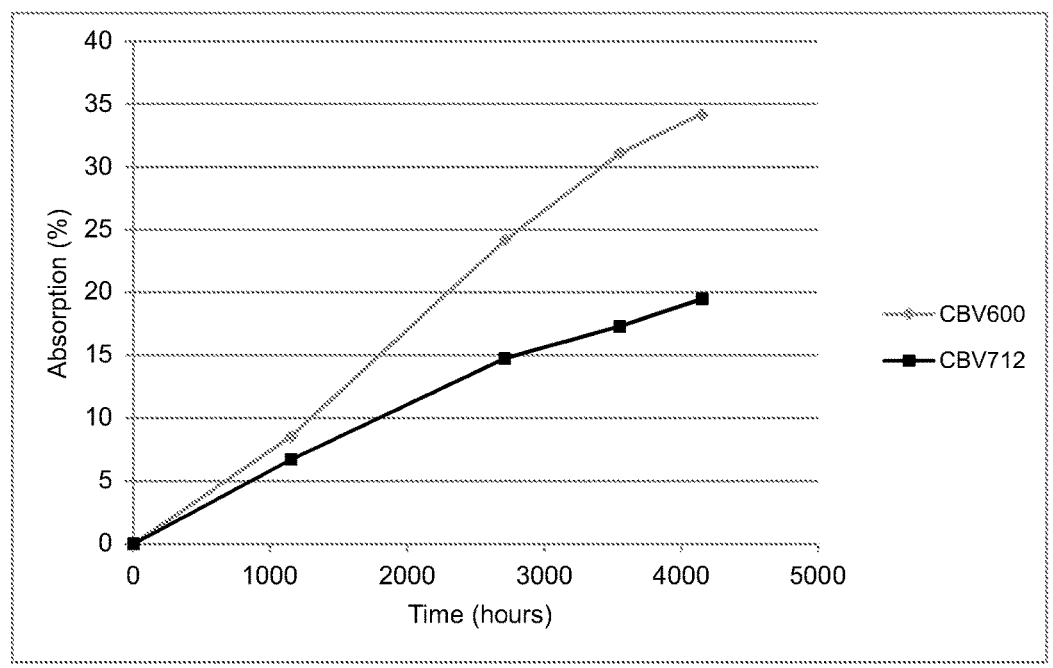

In order to evaluate the ability of the zeolite particles to absorb the crosslinking by-products even during storage at room temperature, a sample of zeolite CBV600 (Example 12) or of zeolite CBV712 (Example 13) was placed into a bag made from Polylam™, where also a small container containing cumyl alcohol was placed. The bag was hermetically closed. The amount of cumyl alcohol absorbed by the zeolite sample was measured over time by extracting the zeolite sample from the bag after a certain time. The results are reported in the diagram of FIG. 5, from which it appears that the zeolite continued to absorb cumyl alcohol even after more than 4000 hours of exposure at 23° C. From these data, we can derive that the zeolite particles placed in the vicinity of the insulating layer of an energy cable should be able to eliminate the crosslinking by-products not only during degassing heating but also during storage of the cable at ambient temperature.

The invention claimed is:
1. An energy cable comprising at least one cable core comprising:
   an electric conductor formed by a plurality of stranded electrically conducting filaments;
   an extruded crosslinked electrically insulating layer;
   a semiconducting layer; and
   zeolite particles that are placed in the cable core, wherein the zeolite particles have (a) a SiO$_2$/Al$_2$O$_3$ molar ratio equal to or lower than 20; (b) a maximum diameter of a sphere that can diffuse along at least one axes direction equal to or greater than 3 Å; and (c) a sodium content, expressed as Na$_2$O, equal to or lower than 0.3% by weight.
2. The energy cable according to claim 1, wherein the zeolite particles are dispersed in/on a substrate, said substrate comprising filling material, hygroscopic yarn and/or hygroscopic tape.
3. The energy cable according to claim 1, wherein the zeolite particles have a SiO$_2$/Al$_2$O$_3$ molar ratio equal to or lower than 15.
4. The energy cable according to claim 1, wherein the zeolite particles are placed in the cable core: (i) within voids among said filaments; (ii) in contact with the semiconducting layer; or (iii) within voids among said filaments and in contact with the semiconducting layer.
5. The energy cable according to claim 4, wherein when the zeolite particles are placed in contact with the semicon- ducting layer, the semiconducting layer is an outer semiconducting layer surrounding the electrically insulating layer.

6. The energy cable according to claim 1, wherein the extruded crosslinked electrically insulating layer comprises at least one polyolefin crosslinked by reaction with at least one organic peroxide.

7. A method for extracting crosslinking by-products from a cross-linked electrically insulating layer of an energy cable core, comprising:

manufacturing an energy cable core comprising an electric conductor formed by a plurality of stranded electrically conducting filaments, an extruded crosslinked electrically insulating layer containing cross-linking by-products, and zeolite particles that are placed in the cable core, wherein the zeolite particles have (a) a $SiO_2/Al_2O_3$ molar ratio equal to or lower than 20; (b) a maximum diameter of a sphere that can diffuse along at least one axes direction equal to or greater than 3 Å; and (c) a sodium content, expressed as $Na_2O$, equal to or lower than 0.3% by weight;

heating the energy cable core up to a temperature causing migration of the crosslinking by-products from the crosslinked electrically insulating layer to the zeolite particles, whereby the zeolite particles absorb the crosslinking by-products; and then placing a metal screen around the energy cable core.

8. The method according to claim 7, wherein heating the energy cable is carried out at a temperature of from 70° C. to 80° C., for 7 to 15 days.

9. The method according to claim 7, wherein heating the energy cable causes at least one fraction of the crosslinking by-products to be irreversibly absorbed into the zeolite particles.

10. The method according to claim 7, wherein the zeolite particles are placed in the cable core: (i) within voids among said filaments; (ii) in contact with the semiconducting layer; or (iii) within voids among said filaments and in contact with the semiconducting layer.

11. The method according to claim 7, wherein the extruded crosslinked electrically insulating layer comprises at least one polyolefin crosslinked by reaction with at least one organic peroxide.

* * * * *